Patented Feb. 21, 1950

2,498,466

UNITED STATES PATENT OFFICE 2,498,466

PHENOLIC COLOR FORMERS

Henry T. Thompson, Easton, Pa., assignor to General Aniline & Film Corporation, New York, N. Y., a corporation of Delaware No Drawing. Application May 9, 1946,
Serial No. 668,460

4 Claims. (Cl. 95—6)

The present invention relates to color photography and more particularly to color-forming components for the cyan image.

It is known that by the reaction of color-forming components with the oxidation products of a primary aromatic amino developer, dyestuff images may be produced in photographic film in situ with the silver images formed during development. The color-forming components may be located either in the film itself or in the photographic developer. In three-color photography, it is usual to sensitize a three-layer film for blue, green and red, and to produce in the blue-sensitive layer a yellow dyestuff image, in the green-sensitive layer a magenta image, and in the red-sensitive layer a cyan image. The color-forming components employed to give the cyan images upon color development are usually phenols.

It is also known in three-color photography that the key image is the cyan image. This image in order to give proper color rendition must possess certain spectral properties. These properties include the ability of the dyestuff image to transmit in both the green and blue parts of the spectrum. In other words, the color-forming component for the cyan image must be one which yields a dyestuff which is minus red in color rather than blue or green.

In the past, it has been suggested to use for the purpose of producing the cyan image, color-forming components which are amides of hydroxy aromatic carboxylic acids. These amides have been prepared with the nitrogen atom of the amide group substituted by a long alkyl chain such as by an octyl, decyl, stearyl, cetyl or a like radical. It has been discovered, however, that compounds of this character give dyestuffs on color-forming development which are too blue in color.

Amides have also been prepared in which the nitrogen atom of the amide group is substituted by an aryl radical such as phenyl, diphenyl and the like. These compounds, in contrast to those in which the nitrogen atom possesses an alkyl chain, yield on color development, dyestuffs which are generally too green in color.

There have also been used amides in which the nitrogen atoms of the amide group have been substituted by both alkyl, i. e., methyl, ethyl and the like, and aryl, i. e., phenyl, diphenyl and the like. These compounds in which the nitrogen atom is tertiary in nature, resemble the compounds in which the nitrogen atom is substituted by a long alkyl chain since they have the property of producing on color-forming development, dyestuff images which are too blue in color.

I have now discovered that the desired blue-green dyestuff images can be obtained on color-forming development by the utilization of color-forming development components which are hydroxy aromatic carboxylic acid amides of diamines in which a nitrogen atom of one amide group is directly linked to an arylene radical and in which the nitrogen atom of the other amide group is directly substituted by an alkylene or an alkyl radical. Compounds which answer these prerequisites have the following general constitution.

I  $\quad\quad\quad\quad\text{RCON(H)—R'—alkylene—N(H)COR}$

II $\quad\quad\quad\quad\text{RCON(H)—R'—N(R}^2\text{)—COR}$ in which R is a phenolic radical in which the phenolic hydroxyl group is in ortho position to the amide group, R' is an arylene radical such as phenylene, naphthylene and the like, and $R^2$ is alkyl such as ethyl, propyl, butyl, amyl, hexyl, stearyl, octyl and the like.

The following compounds are illustrative of products contemplated by general Formula I:

(1) 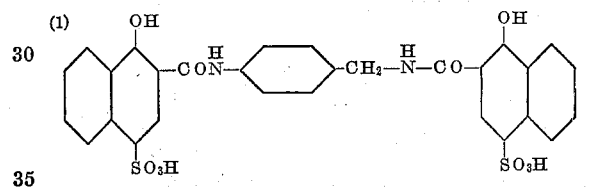

The diamide of 1-hydroxy-4-sulfo-2-naphthoic acid and 4-amino-benzylamine (2) 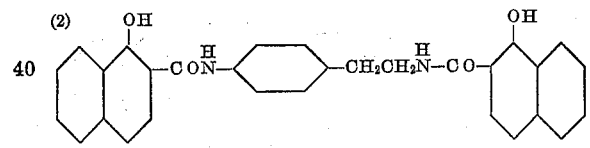

The diamide of α-hydroxy-β-naphthoic acid and 4-(beta-amino-ethyl) aniline (3) 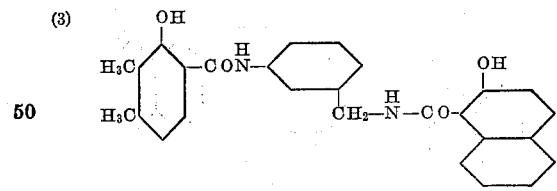

1-(β-hydroxy-α-naphthoylamidomethyl)-3-(2-hydroxy-3,4-dimethyl-benzoyl-amido)-benzene (4)

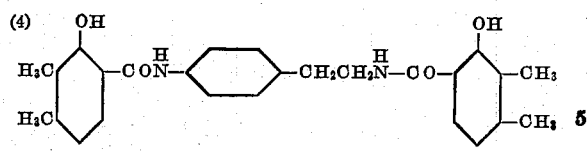

The diamide of 2-hydroxy-3.4-dimethylbenzoic acid and 4-(beta-aminoethyl)-aniline (5)

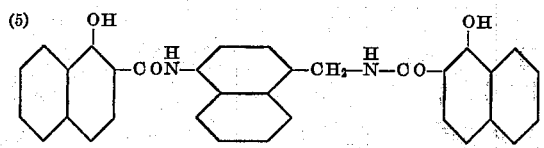

The diamide of α-hydroxy-β-naphthoic acid and 4-(aminomethyl)-naphthyl amine (6)

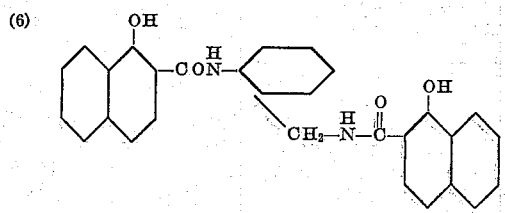

The diamide of α-hydroxy-β-naphthoic acid and 2-(aminomethyl)-aniline (7)

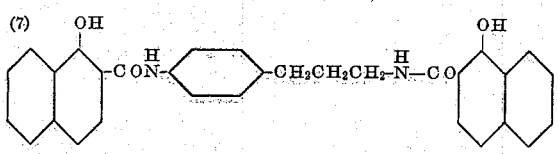

The diamide of α-hydroxy-β-naphthoic acid and 4-(gamma-aminopropyl)-aniline (8)

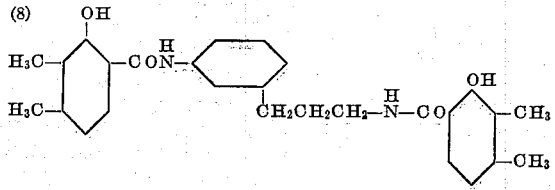

The diamide of 2-hydroxy-3.4-dimethylbenzoic acid and 3-(gamma-aminopropyl)-aniline Examples of compounds of general Formula II are the following:

(9)

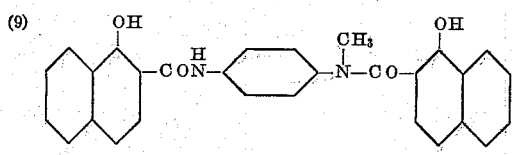

The diamide of α-hydroxy-β-naphthoic acid and 4-(N-methyl amino)-aniline (10)

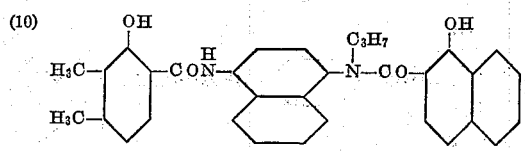

1-(α-hydroxy-β-naphthoyl-(N-propyl)-amido)-4-(2-hydroxy-3.4-dimethyl benzoyl amido)-naphthalene (11)

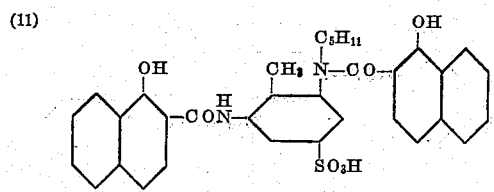

The diamide of α-hydroxy-β-napthoic acid and 2-methyl-3-(N-amyl)-5-sulfo-aniline (12)

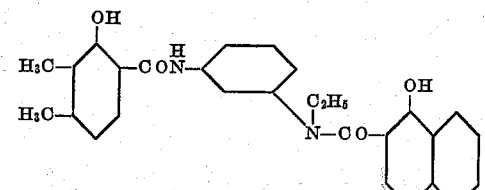

1-(α-hydroxy-β-naphthoyl-(N-ethyl)-amido)-3-(2-hydroxy-3.4-dimethyl benzoyl amido)-benzene (13)

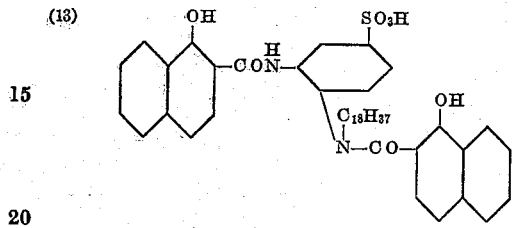

The diamide of α-hydroxy-β-naphthoic acid and 2-(N-stearyl-amino)-5-sulfo aniline It will be observed that in these compounds the phenol radical at the ends of the chain may be the same or different. Again, in the compounds of type I, the alkylene radical may be in para-, meta- or ortho-position to the amide linkage, the nitrogen atom of which is directly linked to the arylene radical. Similarly, the nitrogen atom substituted by alkyl may occupy a position on the arylene ring which is ortho-, meta- or para- to the other amide nitrogen atom.

The color-forming components may be produced by methods usual in the art for the production of diamides. This involves the condensation of one mol of the diamine with two mols of the carbonyl chloride of the phenol in the presence of an acid-binding agent such as pyridine, triethylamine and the like. The condensation is usually effected by heating and the diamide is precipitated from the reaction mixture by chilling with ice. The compounds can be purified by recrystallization from methanol and are then ready for use either as additions to the silver halide emulsion or to the photographic developer.

The following examples serve to illustrate my invention but it is to be understood that the invention is not restricted thereto:

*Example 1*

1 mol of 1-amino-4-benzylamine is dissolved in 1 liter of pyridine and 2 mols of 1-hydroxy-4-sulfo-2-naphthoic acid chloride are added to the solution. The mixture is then heated to a temperature of about 70° C. The product formed is precipitated by the addition of ice and is purified by recrystallization from hot methanol.

8 grams of the resulting compound are dissolved in 3 cc. of sodium hydroxide of 40% strength, 25 cc. of methanol, and 70 cc. of water. The resulting solution is added to 500 cc. of a silver bromide gelatin emulsion.

The emulsion thus obtained is cast onto a film base. After exposure and development in a developer essentially comprising paradiethylaminoaniline, a minus red image is obtained.

*Example 2*

The procedure is as outlined in Example 1 except that there is employed 1 mol of 4-(beta-amino-ethyl)-aniline and 2 mols of α-hydroxy-β-naphthoic acid chloride.

*Example 3*

The procedure is the same as in Example 1 except that there is used in lieu of the naphthoic acid chloride, 2 mols of 2-hydroxy-3.4-dimethyl benzoic acid chloride and in lieu of the amino benzylamine 1 mol of 3-(gamma-aminopropyl)-aniline.

*Example 4*

1 mol of 1-amino-4-(β-aminoethyl)-benzene is dissolved in 1 liter of pyridine and to the resulting solution there is added 2 mols of α-hydroxy-β-naphthoic acid chloride. The solution is heated to a temperature of 75° C. The product of the condensation reaction is precipitated by the addition of ice and after separation by filtration, it is purified from hot methanol.

The product when introduced into a silver halide emulsion as in Example 1 yields on exposure of the emulsion and development with paradiethylaminoaniline a minus red image.

*Example 5*

The procedure is the same as in Example 4 except that there is employed in lieu of the naphthoic acid chloride 2 mols of 2-hydroxy-benzoic acid chloride and in lieu of the 1-amino-4-methylaminobenzene, 1 mol of 1-amino-4-(gamma-aminopropyl)-naphthalene.

If desired, the products of the present invention can be rendered fast to diffusion by introduction into the final radical of a natural resin, a long alkyl chain, or the like.

Methods by which compounds of the present type may be rendered fast to diffusion are disclosed in U. S. P. 2,154,918, 2,156,821, 2,178,612, 2,179,244, 2,179,238, 2,179,228, 2,179,239, 2,186,849 and the like.

It has been stated above that the color-forming components may be employed in the photographic developer. This of course only holds true where the color-forming components have not been additionally treated to introduce a radical designed to render the components fast to diffusion in gelatin. If it be desired to utilize the color-forming components in the developer rather than in the emulsion, .5 gram of the component selected may be added to 100 cc. of a color-forming developer such as dimethylaminoaniline. By treating a latent image with this developer, a blue-green dyestuff image is obtained in situ with the silver image. The silver image may be removed by a potassium ferricyanide solution.

I claim:

1. A silver halide emulsion for color photography containing as the color former for the minus red image a compound of the following formula:

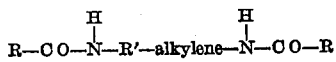

wherein R is a phenolic radical in which the phenolic hydroxyl group is in ortho position to the amide group, and R' is arylene.

2. A photographic silver halide emulsion for color photography having as the color former for the minus red image a compound of the following formula:

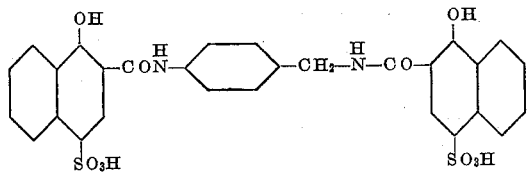

3. A photographic silver halide emulsion for color photography containing as the color former for the minus red image the compound of the following formula:

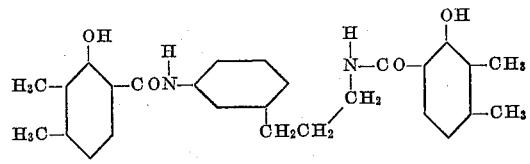

4. A photographic silver halide emulsion for color photography containing as the color former for the minus red image the compound of the following formula:

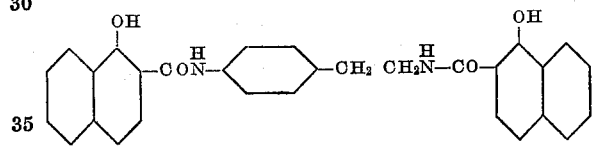

HENRY T. THOMPSON.

REFERENCES CITED

The following references are of record in the file of this patent:

UNITED STATES PATENTS

| Number | Name | Date |
|---|---|---|
| 2,186,717 | Eggert | Jan. 9, 1940 |
| 2,313,586 | Salminen | Mar. 9, 1943 |
| 2,357,394 | Frohlich | Sept. 5, 1944 |
| 2,366,324 | Schneider | Jan. 2, 1945 |

FOREIGN PATENTS

| Number | Country | Date |
|---|---|---|
| 503,752 | Great Britain | Apr. 11, 1939 |
| 538,914 | Great Britain | Aug. 21, 1941 |